United States Patent [19]

Cannon et al.

[11] 4,376,807
[45] Mar. 15, 1983

[54] TREATMENT OF FORMALDEHYDE LADEN WOOD PANELS TO REDUCE EXCESS FORMALDEHYDE

[75] Inventors: Dickson Y. Cannon, Anchorage, Ky.; Norman G. Wolfe, New Albany, Ind.

[73] Assignee: Reliance Universal, Inc., Louisville, Ky.

[21] Appl. No.: 200,772

[22] Filed: Oct. 27, 1980

[51] Int. Cl.³ .................... B32B 21/08; B32B 27/42
[52] U.S. Cl. ............................ 428/528; 427/341; 427/342; 427/401; 427/382; 428/529; 156/331.9
[58] Field of Search ............ 427/341, 342, 401, 382; 428/528, 529; 156/331.9

[56] References Cited

U.S. PATENT DOCUMENTS

| 2,833,670 | 5/1958 | Roth | 427/342 X |
| 2,870,041 | 1/1959 | Waddle et al. | 427/341 X |
| 4,186,242 | 1/1980 | Holmquist | 427/342 X |

OTHER PUBLICATIONS

Paper given at 1980 Particleboard Symposium, "Using the Verkor FD-EX Chamber to Prevent Formaldehyde Emission from Boards, Manufactured with Urea Formaldehyde Glues," Steve I. Simpson, Date of first publication unknown, p. 3.

Primary Examiner—Michael R. Lesignan
Attorney, Agent, or Firm—Francis H. Boos

[57] ABSTRACT

A substantial reduction of free excess formaldehyde in formaldehyde laden wood panels is achieved by coating at least one side of the panel with a salt solution containing an ammonium cation such as a 10-15% aqueous solution of ammonium bicarbonate. After coating, a barrier is placed over the coated surface such as by stacking a plurality of similarly coated panels with the barrier being maintained sufficiently long to allow ammonia gas generated from normal degradation of the ammonium salt to migrate to the free formaldehyde zone where the ammonia gas reacts with the formaldehyde to produce a stable, low volatility reaction product. The treatment may be applied to raw or finished panels and the generated ammonia gas reacts in the stacked panels with formaldehyde in both the glue lines and the formaldehyde based finish topcoating.

9 Claims, 2 Drawing Figures

TREATMENT OF FORMALDEHYDE LADEN WOOD PANELS TO REDUCE EXCESS FORMALDEHYDE

BACKGROUND OF INVENTION

1. Field of Invention

This invention relates to methods of treating formaldehyde laden wood panels to neutralize free formaldehyde existing in the panels. It has as its intended purpose the reduction in the release of vaporous formaldehyde to the atmosphere within structures, such as mobile homes, where, for example, the panels are typically used for decorative wall panelling. While this represents one field within which the invention is useful, it may also be employed with any form of formaldehyde laden wood product wherein the end use of the wood product results in the significant accumulation of vaporous formaldehyde in an enclosed or semi-enclosed space.

2. Background of the Invention

It is well known in the production of laminated wood panels to use as the laminate glue synthetic resins comprised of the reaction products of formaldehyde with urea, phenol or melamine. It is also common practice to coat panels with one or more coatings based on formaldehyde amino condensates as well as other resins. It has been found and is now well known that vaporous formaldehyde can be released from these panels, some of which is due to unreacted formaldehyde in the glue and coating resins and some of which is due to degradation and/or decomposition products generated over time under acid conditions, elevated temperature and/or humidity. This free, vaporous formaldehyde can be a strong irritant when allowed to accumulate in an enclosed space such as, for example, the interior of a mobile home. It is also suspected of being hazardous to the health of humans when allowed to accumulate to abnormally high levels in the ambient atmosphere. It is, therefore, desirable to neutralize free formaldehyde in the wood products to prevent or substantially reduce its release into the surrounding environment.

One well known technique accomplishing this result is to react the formaldehyde with ammonia to yield hexamethylene tetramine, a less volatile substance than either parent and one that is very stable at normal ambient conditions. The chemical formula for this well known reaction is:

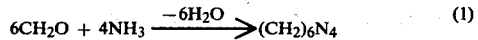

$$6CH_2O + 4NH_3 \xrightarrow{-6H_2O} (CH_2)_6N_4 \quad (1)$$

In one technique, the formaldehyde containing panel is placed in an enclosed space such as a desiccator saturated with gaseous ammonia from an aqueous ammonia solution. The vaporous ammonia released in the desiccator migrates into the porous wood panel to react with and neutralize the free formaldehyde in a very effective manner. Comparative tests between untreated control samples and treated samples have shown that vaporous formaldehyde concentration in the atmosphere can be reduced by an order of magnitude. For example, one such laboratory test showed a reduction from 8.2 parts per million (ppm) to 0.5 ppm. Unfortunately, however, while exposing panels to vaporous ammonia for this purpose is very effective, the technique does not lend itself well to high volume wood panel production and processing at normal production rates. The technique would require considerable investment in an enclosed facility to maintain the panels exposed to vaporous ammonia. Also, the strong ammonia odor involved, as well as environmental pollution considerations could make the technique unwieldly and impractical for plant use without extensive and costly equipment addition and/or modification.

An alternative technique involves coating the wood panels with an aqueous ammonia solution. Although this technique facilitates the application of ammonia to the wood product, it is less effective than long term exposure to vaporous ammonia in neutralizing the formaldehyde. It has been found that the ammonia coating is effective mainly only as a surface treatment since the ammonia is quickly released to the ambient atmosphere and does not effectively penetrate the panel to reach the entrained free formaldehyde. When used in open plant processing areas, there is considerable worker exposure to vaporous ammonia with consequent unpleasant odor and irritation, as well as environmental control problems.

It is, therefore, an object of the present invention to provide a method for treatment of formaldehyde laden wood products that is effective in the reduction of free formaldehyde in the product while at the same time avoiding the disadvantages of prior known techniques.

It is also an object of the invention to provide a method of treating formaldehyde laden wood products that is particularly well adapted to the high volume treatment and handling of flat line wood panels.

It is a further object of the invention to provide a formaldehyde treatment method which is readily adaptable to high volume manufacturing plant processing without undue worker exposure to vaporous ammonia.

It is yet another object of the invention to provide a formaldehyde treatment method which can be employed with existing plant equipment and which does not require investment in extensive off-line treatment and handling facilities, or additional pollution control equipment.

SUMMARY OF THE INVENTION

Thus, in accordance with the present invention, there is provided a method of treating formaldehyde laden wood prodcuts to reduce the emission of free formaldehyde from the product, wherein the method comprises the steps of treating at least one side of the panel with an ammonium salt solution, the ammonium salt being one which hydrolizes in the presence of water to form ammonium hydroxide, the ammonium hydroxide decomposing to generate ammonia in sufficient degree to be available to react with the free formaldehyde in the wood product. A barrier is then provided between the treated panel side and the ambient environment to minimize loss of vaporous ammonia to the ambient environment. The barrier is maintained in place on the treated panel for a predetermined time sufficient to allow the generated vaporous ammonia to migrate through the porous wood to contact and react with the free formaldehyde. In this manner, the salt solution serves as a stable, latent carrier of ammonia that enables normal handling of the wood product during the manufacturing process without uncontrolled loss of free ammonia into the atmosphere, the salt slowly releasing ammonia within the wood product itself to substantially minimize the emission of free formaldehyde from the product. The latent effect of the salt in continuing to generate ammonia long after the initial treatment has the additional benefits of neutralizing formaldehyde in subsequently applied finish coats as well as later released formaldehyde occurring after installation of the panel.

While numerous ammonium salts are believed to be effective for this purpose, a particularly effective salt is ammonium bicarbonate in about ten to fifteen percent aqueous solution. The reaction proceeds generally as follows:

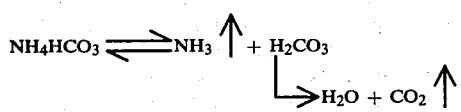
(2)

Although the reaction is reversible in nature, the porous nature of the wood panel laminations allows gradual migration of the intermediately generated ammonia away from the reaction zone which results in the degradation of the remaining unreacted carbonic acid to water and carbon dioxide. Once the intermediate ammonia reaches the zone of free formaldehyde, the stable product, hexamethylene tetramine, is generated as previously described.

The relative availability of ammonia from an ammonium salt residue, deposited from solution, is of importance in determining suitable ammonium salts for this purpose. This availability of ammonia will be indirect with respect to the relative equilibrium constant (Ka) of the acid (HA) formed from the salt's anion (A$^-$) by hydrolysis as seen from the reaction:

$$NH_4^+ + A^- + H_2O \rightleftharpoons NH_4OH + HA \quad (3)$$

It will be appreciated that hydrolysis can occur to a sufficient degree from water left in the board after the salt solution treatment, from ambient air and from the wood itself.

Ionization of both ammonium hydroxide and the acid occurs as shown by:

$$NH_4OH \underset{}{\overset{H_2O}{\rightleftharpoons}} NH_4^+ + OH^- \quad (4)$$

$$HA \underset{}{\overset{H_2O}{\rightleftharpoons}} H^+ + A^- \quad (5)$$

From (5), the equilibrium constant, Ka, is expressed as follows:

$$Ka = \frac{(C_{H^+})(C_{A^-})}{C_{HA}} \cdot \frac{\gamma^2}{\gamma_{HA}} \quad (6)$$

where:
C = molar concentration and $\gamma$ is an activity coefficient. Similarly, $K_b$, the equilibrium constant of the base (NH$_4$OH) can be calculated. Since all salts being considered are ammonium salts, this value is constant and only Ka varies with different anions (A$^-$).

According to Eq. 6 then, a larger Ka value indicates a larger concentration of anion (A$^-$) relative to the un-ionized acid (HA). This larger concentration of anion will force the reaction shown in Eq. 3 to the left, increasing NH$_4$+A$^-$(salt) and decreasing NH$_4$OH (ammonium hydroxide) concentration. A lower Ka value will result in the opposite relative reaction (thus increased NH$_4$OH).

NH$_4$OH (ammonium hydroxide) is a moderately weak base which decomposes as follows:

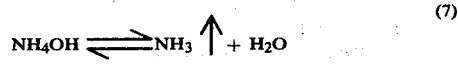
(7)

Ultimately, a larger Ka value (stronger acid) results in less ammonia while a smaller Ka (weaker acid) will result in more ammonia.

A second measure of relative availability of ammonia under dry conditions is also of significance. This may be made by utilizing the thermal decomposition temperatures of the salts. It may be shown from the literature that a direct relationship exists between the thermal decomposition temperature of the salt and the Ka value of the acid derived via hydrolysis. Relative acid strength, as expressed by Ka value is also a measure of the ionic character of the salt. The more ionic a salt is, the more stable to decomposition it becomes. Because of these effects, different salts of ammonia are effective as formaldehyde scavengers to differing degrees, the preferred salts being those exhibiting generally weak acid characteristics.

The actual technique used to apply the salt treatment may be conventional in nature such as roller coating, curtain coating, or spray coating. Preferably, the entire side of the panel being treated should be coated with the salt treatment. When the treated panels are stacked front to back, the adjacent panels serve as the barrier to the ambient environment or atmosphere that traps the subsequently generated vaporous ammonia in the porous interstices of the panel and assures the ammonia reaction with the formaldehyde. Although the exact amount of storage time required to achieve the result depends on various factors such as the ambient temperature and humidity level, the level of free formaldehyde in the panel and the rate of degradation of the ammonium salt, tests have shown that under normal factory conditions, a storage time on the order of sixteen to twenty-four hours, equivalent to overnight storage, is effective to reduce the level of residual formaldehyde by an order of magnitude as compared to an untreated control sample. Moreover, the ability to store the panels in normal stacked manner during the treatment and storage process substantially reduces the additional equipment and facility investment required as compared with the prior art vaporous ammonia process described above.

DETAILED DESCRIPTION

Figure 1:
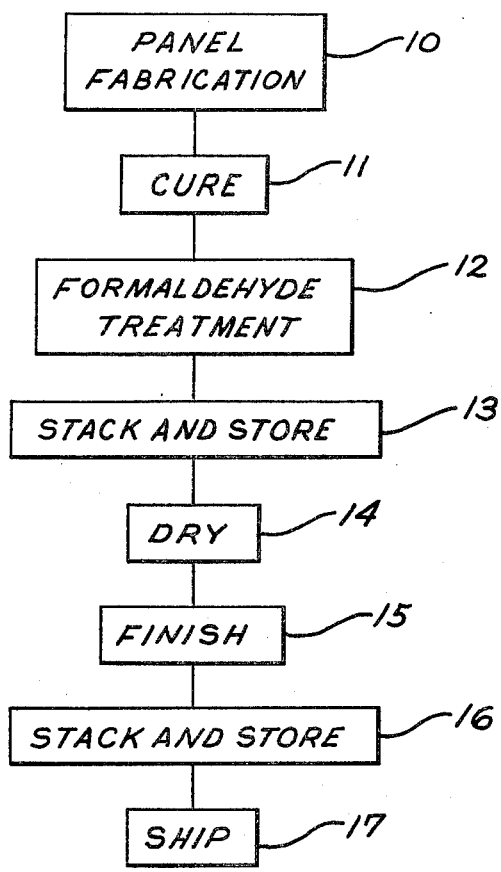
FIG. 1 is a process flow diagram illustrating the stages within a conventional panel manufacturing process at which the present invention may be advantageously practiced.

Referring to FIG. 1, the process flow diagram there shown represents, in highly schematic form, the basic steps involved in the production of finished plywood or hardboard panels with the inclusion of the formaldehyde treatment process of the present invention. Thus box 10 represents the stage at which production of bare laminated panels occurs. This includes applying the formaldehyde based resin to the mating surfaces of the individual laminations and pressing the laminations together to form the integral panel. The panel is then passed through a conventional curing stage 11 in which the formaldehyde and associated chemical (urea, phenol or melamine) are reacted in known manner to bond the laminations together. Complete reaction of formaldehyde with the associated chemical that would leave no free formaldehyde capable of emission from the panel is difficult and oftentimes impossible to achieve. Moreover, formaldehyde emission can occur due to subsequent degradation of the glue and possibly also the finish top coat under high temperature and humidity conditions. Consequently, in accordance with the invention, a formaldehyde treatment stage 12 is provided during wich an aqueous solution of an ammonium salt, such as ammonium bicarbonate, is coated on at least one side of the panel. The salt solution, preferably in a concentration range of about 10–15%, may be applied using any well known coating technique such as roller coating, curtain coating or spray coating. The amount of coating applied is not critical so long as sufficient solution is provided to allow neutralization of the available formaldehyde. If necessary, excess solution can be removed with a squeegee or other suitable means. Although only one surface need be coated with the ammonium salt solution to achieve the benefits of the invention, additional improvement in results can be realized with raw, unfinished panels by coating both surfaces. The solution may be at normal room temperature when applied and the ambient atmosphere during the coating process may also be at normal room temperature, i.e. 60° F. to 90° F. such as would be encountered in a panel manufacturing and processing plant facility.

Promptly after treating the panel surface or surfaces, a barrier is applied to the treated surface to prevent the escape to the ambient atmosphere of in situ generated ammonia gas resulting from disassociation of the ammonium cation from the acid in the salt solution. While an artificial barrier could conceivably be employed, such as a relatively heavy gauge sheet of aluminum foil, or plastic, it has been found adequate to simply stack the panels as they are treated, the adjacent panels themselves serving as the barrier to trap the generated entrained ammonia gas in the panels. The stacked panels, usually in individual bundles of about fifty to one-hundred panels, are then stored for a length of time necessary to enable the generated ammonia gas to migrate into the interior of the panels to contact and react with the free formaldehyde as indicated by box 13 in the drawing. Present indications are that a storage time, at room temperature, of about sixteen to twenty-four hours, is adequate for this purpose. Since this is equivalent to overnight storage, the treatment process does not require an unusual amount of storage facility and does not unduly prolong the manufacturing and finishing process.

Following the storage step, the panels may be dried in stage 14 to remove excess moisture in the panels preparatory to applying a decorative surface finish in stage 15. The decorative surface finish may be applied to the veneer lamination in well known manner, usually by applying a filler, a base coat, an inked decorative pattern and a finish topcoat. After the finish is applied, the panels are again stacked in step 16 and stored pending shipment to the customer, step 17. As is well known, formaldehyde is commonly included in finish topcoats used on decorative wood panels. Tests have indicated that, in untreated wall panels employing formaldehyde containing coatings, substantial amounts of formaldehyde are released from both the glue in the panel and the finish coating. One of the advantages of the present invention is that the stacked, finish-coated panels continue to benefit from the gradual release of ammonia gas as the ammonium salt in each panel continues its degradation process. The process is enhanced by the fact that it is customary to stack finished panels front to back which places the finish surface in direct contact with the ammonium salt treated back surface of the panel. It will be appreciated that the salt solution treatment may be applied to raw panel or, in the alternative, to panels which have been finish-topcoated prior to treatment or included in the actual finishing process.

Figure 2:
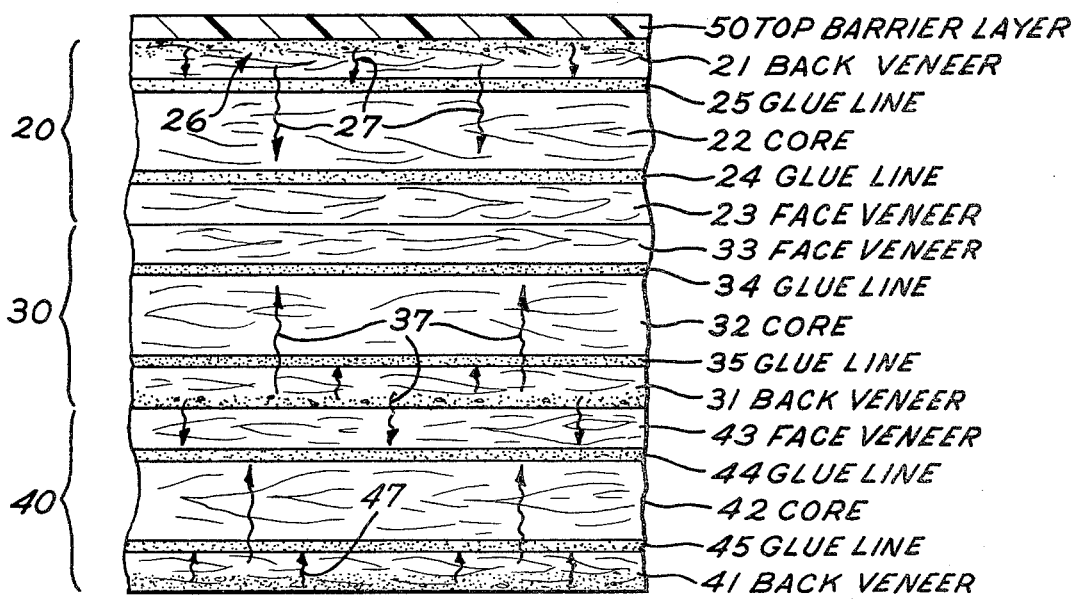
FIG. 2 is a cross-section of segments of three laminated wood panels treated in accordance with the present invention and useful in explaining the process by which the free formaldehyde reduction is achieved.

Turning now to FIG. 2, the mechanism by which the treatment process works will be considered. Illustrated in the drawing are portions, in cross-section, of the top three panels 20, 30, 40 of a stack of, for example, one hundred finished panels treated with aqueous ammonium salt solution coated on the back lamination of each panel as described above. Each panel comprises a back layer or lamination 21, 31, 41, a central core lamination 22, 32, 42 and a face veneer lamination 23, 33, 43. The laminations may by any well known wood variety commonly used in wood panels, such as lauan or birch. The laminations are bonded together at glue lines 24, 25, 34, 35 and 44, 45, the glue comprising a formaldehyde resin as previously described. It will be assumed that the face veneer laminations have been finished coated and that, in accordance with normal practice, the interior panels 30, 40 are stacked front to back while the topmost panel 20 is stacked front to front with the next adjacent panel 30. An optional top barrier layer 50 may be placed on top of panel 20, facing the back lamination 21. The previously applied coatings of ammonium salt solution 26, 36, 46 are absorbed by back laminations 21, 31, 41 to a depth of approximately one-third to one-half of the thickness of the back panels. The degree of penetration will be, in part, dependent on the concentration of the solution and on the porosity of the wood lamination. It has not been found to be necessary, however, that the solution penetrate entirely to the respective glue lines 25, 35, 45 when only the back laminations are coated, nor to glue lines 24, 34, 44 when the face veneer laminations are also coated. While the panels are stacked in storage, the normal degradation of the ammonium salt in each panel causes vaporous ammonia to be released and, over time, to migrate away from the degradation zone toward the glue lines as indicated by arrows 27, 37, 47.

The front to back orientation of the stacked panels results in the ammonia that is generated in the back lamination 31 to migrate not only upwards to the adjacent glue line 35, but also downwards through the face veneer lamination 43 to glue line 44 of adjacent panel 40. This crossover effect into adjacent panels is most pronounced when the formaldehyde treatment is applied to raw, unfinished panels such that the ammonia gas can readily migrate into laminations of adjacent panels. When pretreated panels are restacked after the finish coating is applied or when the formaldehyde treatment is intially applied subsequent to application of the finish coats, the finish coat may retard passage of the ammonia gas into the face veneer lamination of the adjacent panel. However, as previously noted, finish coating materials commonly employ formaldehyde as one of the ingredients and a further advantage of the invention resides in the fact that slowly released ammonia gas in the stacked panels reacts with the free formaldehyde in the finish coatings thus preventing them from adding significantly to the release of formaldehyde after installation of the panels. While this is true of panels treated on only the back side, it will be apparent that the effect can be significantly enhanced by applying the salt solution to both sides of raw unfinished panels before the finish coating is applied.

Since it is customary to stack the top panel 20 face to face with the next panel 30 in a stack (similarly with respect to the bottom and next-to-the bottom panels in the stack), it is possible for generated ammonia gas to migrate out from these outermost panels to the ambient atmosphere thus reducing the effectiveness of the treatment process as to these outermost panels of each stack. While the amount of formaldehyde ultimately to be released from such a small percentage of panels should not present a significant practical problem, it may be desirable to employ an optional barrier 50 such as aluminum foil or other stiff, gas-impervious material such as a sheet of aluminum or plastic to retain the released ammonia gas in the outermost panels.

EXAMPLE No. 1-4

In a test to determine the effectiveness of treatment with an ammonium salt solution, four sets of lauan panel samples were prepared; with each set consisting of six 4"×4" panels cut from the same 4'×8' sheet of standard 5/32" three ply lauan panel. The panel used was raw and unfinished. After treatment and interior storage, as described, the centermost panel from each set was removed and tested for formaldehyde release by placement in a chamber at 120° F. for two hours. Air was flowed through the chamber at 120 ml/min. and bubbled through a collection bottle filled with 15 ml. of deionized water. Ambient relative humidity was maintained at 40%. The sample from the collection bottle was tested for formaldehyde using a known chromatropic acid analytical method as proposed by the U.S. National Institute of Occupational Safety and Health.

The specific treatment and storage time for each panel set was as follows:

Set No. 1—Panels wet coated on both sides with a saturated solution of ammonium bicarbonate, stacked and wrapped in aluminum foil for one day to simulate in-plant stacking and then exposed to ambient atmosphere for four days before being tested for formaldehyde.

Set No. 2—Panels wet coated on both sides with saturated solution of ammonium bicarbonate, stacked and wrapped in aluminum foil for five days and then unwrapped and tested for formaldehyde.

Set No. 3—Panels wet coated on both sides with water, stacked and wrapped in aluminum foil for two days and then unwrapped and tested for formaldehyde.

Set No. 4—Plain untreated panels used for control purposes.

Formaldehyde readings resulting from the tests were as follows:

Set No. 1—0.5 ppm formaldehyde in air
Set No. 2—0.2 ppm formaldehyde in air
Set No. 3—59.7 ppm formaldehyde in air
Set No. 4—17.8 ppm formaldehyde in air The known adverse effect of water on degradation of the resin glue with consequent increase of formaldehyde release was noted from Set No. 3 while Set Nos. 1 and 2 indicate the surprising effectiveness of the ammonium bicarbonate treatment which was found to be equivalent to treatment with vaporous ammonia in an enclosed space.

EXAMPLE NOS. 5-8

Four sets of six lauan 4"×4" panels each were prepared in accordance with the following descriptions and tested for formaldehyde using the procedure described in Examples 1-4.

Set No. 5—Panels: 5/32" lauan, finished with melamine formaldehyde-based finish topcoat over standard filler, base coat, and decorative inking. Panels were not coated with ammonium bicarbonate solution for control purposes but were wrapped in aluminum foil with a layer of water saturated paper towelling separated from the panels by a sheet of aluminum foil. (References to "moisture treatment" in subsequent examples indicate inclusion of the water saturated towelling with the foil wrapped panels as just described). Panels in Sets No. 5-8 remained wrapped in aluminum foil for 24 hours before test for formaldehyde release.

Set No. 6—Panels as described in Set No. 5, treated on back lamination with a 10% aqueous solution of ammonium bicarbonate, wrapped in aluminum foil with moisture treatment.

Set No. 7—Panels as described in Set No. 5, treated on the back lamination with a 10% aqueous solution of ammonium bicarbonate, wrapped in aluminum foil without moisture treatment.

Set No. 8—Panels as described in Set No. 5 except without application of formaldehyde based finish topcoat, treated on back lamination with 10% aqueous solution of ammonium bicarbonate and wrapped in aluminum foil with moisture treatment.

The purpose of the moisture treatment is to enhance the release of formaldehyde thus providing extreme test conditions. Test for formaldehyde release produced results as follows:

Set No. 5—40.5 ppm formaldehyde in air
Set No. 6—15.5 ppm formaldehyde in air
Set No. 7—13.5 ppm formaldehyde in air
Set No. 8—11.9 ppm formaldehyde in air

EXAMPLE NOS. 9-12

Four sets of filled, base coated and inked lauan panels (same as Example Sets Nos. 5-8) were treated on the back lamination only with a 15% aqueous ammonium bicarbonate solution and tested for formaldehyde release using the procedure described in Example Nos. 1-4. Panels remained wrapped in aluminum foil for 24 hours before test for formaldehyde release. The results were as follows:

|  | Formaldehyde-Based Finish Topcoat Included | Moisture Treatment In Wrapped Stack | Formaldehyde Reading |
|---|---|---|---|
| Set No. 9 | Yes | No | 6.2 ppm |
| Set No. 10 | Yes | Yes | 16.4 ppm |
| Set No. 11 | No | Yes | 4.2 ppm |
| Set No. 12 | No | No | 2.7 ppm |

Set No. 10 indicates adverse effect of moisture on formaldehyde release from the finish topcoat but results still show significant reduction from the level of 40.5 ppm obtained from the untreated control panel in set No. 5.

EXAMPLES NOS. 13-15

Set No. 13—Unfinished 5/32" lauan panels treated on both sides with 10% aqueous solution of ammonium bicarbonate and subsequently finished on the face veneer side as described for Example No. 5, wrapped in aluminum foil with moisture treatment and left wrapped for 24 hours before unwrapping and testing for formaldehyde using the procedure described in Examples 1-4.

Set. No. 14—Panels prepared and tested as described for Example 13 except formaldehyde based finish topcoat omitted and panels left wrapped in foil for seven days before testing for formaldehyde release.

Set. No. 15—Raw, unfinished 5/32" 4"×4" lauan panels coated on the back lamination with only water, no ammonium bicarbonate treatment, wrapped in foil with moisture treatment and left wrapped for 24 hours before formaldehyde test.

The results of the formaldehyde tests were:
Set No. 13-10.0 ppm formaldehyde in air
Set No. 14-9.4 ppm formaldehyde in air
Set No. 15-55.6 ppm formaldehyde in air

EXAMPLE NOS. 16-18

In these examples, full size 4'×8'×5/32" raw lauan panels were treated with 15% aqueous ammonium bicarbonate solution using a paint roller with excess solution squeegeed off. In Example No. 16, no ammonium bicarbonate treatment was applied for control purposes. In Example 17, the solution was applied to the back lamination only, while in Example 18, the solution was applied to both the back and face veneer laminations. Eight panels were included in each example set and were stacked with each set being separated by 3 mil polyethylene plastic sheets. The stacked panels were allowed to remain overnight following which all panels were then finish-coated on the face veneer lamination in normal manner as previously described. The panels were restacked with each example set stack again being separated by 3 mil polyethylene sheets for a period of about three weeks. The panels were then cut into 4"×4" sqaures and wrapped in aluminum foil with moisture treatment included. The panels remained wrapped for a period of seven days after which they were tested for formaldehyde evolution in accordance with the procedure described in Examples 1-4.

The results of the tests were as follows:
Set No. 16-45.0 ppm formaldehyde in air
Set No. 17-4.7 ppm formaldehyde in air
Set No. 18-1.9 ppm formaldehyde in air

EXAMPLE NO. 19

In order to check results of a panel treated after finish topcoating was applied, panels from Set No. 16 were aged for 60 days and control samples tested as above, for an average formaldehyde reading of approximately 28 ppm formaldehyde in air. Representative number of samples of these panels were then treated with a 15% solution of ammonium bicarbonate on the back side, stacked with moisture treatment and tested, as above, with an average reading of 1.9 ppm formaldehyde in air.

EXAMPLES NOS. 20-24

Tests of alternative ammonium salt solutions were run in which panels were prepared and tested for formaldehyde in accordance with Example Set No. 2 above with the following exceptions: instead of the ammonium bicarbonate solution, 15% aqueous solutions of alternative ammonium salt solutions were used with four of the example sets as listed below and the sets of panels were stacked and wrapped for a period of only 16 hours. The results were:

|  | Salt Solution | Formaldehyde Test Results In Air |
|---|---|---|
| Set No. 20 | Ammonium phosphate | 0.7 ppm |
| Set No. 21 | Ammonium sulphate | 18.8 ppm |
| Set No. 22 | Ammonium bicarbonate | 0.8 ppm |
| Set No. 23 | Ammonium acetate | 0.82 ppm |
| Set No. 24 | Ammonium nitrate | 11.85 ppm |

These tests indicate the comparability of results using ammonium salts that hydrolize to form weak intermediate acids while confirming that ammonium salts that form strong intermediate acids do not allow sufficient evolution of ammonia to be as effective as would be desired for practical application.

It will be appreciated from what has been described that a significant reduction in free formaldehyde release from wood panels can be achieved by use of suitable ammonium salt solutions without the objections that attend the direct use of the ammonia gas or liquid ammonia prior art methods. An important feature of the invention is that by using an ammonium salt solution to serve as a carrier for the gradual, delayed release of ammonia allows the solution to penetrate the porous interstices of the wood product where the resulting ammonia can be entrained until it reaches and reacts with the free formaldehyde. A particular advantage of this feature is that the ammonia continues to be available in the wood product latency long after installation in its final end use. The relative stability of the ammonium salt (compared with direct usage of ammonium hydroxide, for example) enables factory workers to use conventional coating techniques to treat the panels without undue exposure to vaporous ammonia. Moreover, the use of the stacking of the panels as the barrier to trap the ammonia gas in the panels mitigates against the need for costly additional equipment, or expensive facilities in the manufacturing or finish processing plant.

While, in accordance with the patent statutes, there have been described what at present are believed to be preferred embodiments of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. A method of after treating formaldehyde laden wood panel products to reduce the emissions of free formaldehyde from the product, the method comprising the steps of treating at least one side surface of the panel subsequent to composition of the panel with an ammonium salt solution, the ammonium salt being one which hydrolizes at ambient temperatures below 120° F. in the presence of water to form ammonium hydroxide and a weak acid, wherein the ammonium hydroxide decomposes to generate ammonia in sufficient degree to be available to react with the free formaldehyde in the wood product;

establishing a barrier between the treated panel side and the ambient environment to minimize loss of vaporous ammonia to the ambient environment;

and maintaining the treated panel with the barrier in place for a predetermined time sufficient to allow the vaporous ammonia to migrate into the formaldehyde laden zones of the panel;

whereby a stable reaction product of gaseous ammonia and formaldehyde is formed, substantially reducing the emission of formaldehyde from the wood panel product.

2. The method of claim 1 in which the salt solution is selected from the group consisting of ammonium carbonate, ammonium bicarbonate, ammonium phosphate and ammonium acetate.

3. The method of claim 1 in which the salt solution is an aqueous solution of ammonium bicarbonate of at least about 10% concentration.

4. The method of claim 3 in which the concentration of ammonium bicarbonate is in the range of about 10%–15%.

5. The method of claim 1 in which a finish coating is applied to one side of the panel and the other side of the panel is subsequently treated with the ammonium salt solution.

6. The method of claim 1 in which the panel is treated with the ammonium salt solution on both sides and barriers are maintained in place on both sides for said predetermined time before any finish coating is applied to the panel.

7. The method of claim 1 in which a formaldehyde-based finish coating is applied to one side of each of a plurality of said panels, the other side of each of said panels is treated with the salt solution and said panels are stacked such that the finish coated side of each panel in the stack serves as said barrier for the treated other side of each adjacent panel in the stack.

8. The method of claim 1 in which a plurality of said panels are treated, stacked and stored for a time period of about 16–24 hours at ambient room temperature before finish coating is applied to said panels.

9. A formaldehyde-laden wood panel product treated in accordance with the method of claim 1 to reduce the emission of free formaldehyde from the product.

* * * * *